No. 674,553.  
Patented May 21, 1901.
C. B. DE BOLT & T. W. HINDE.
FLUE CUTTER.
(Application filed Jan. 12, 1901.)
(No Model.)
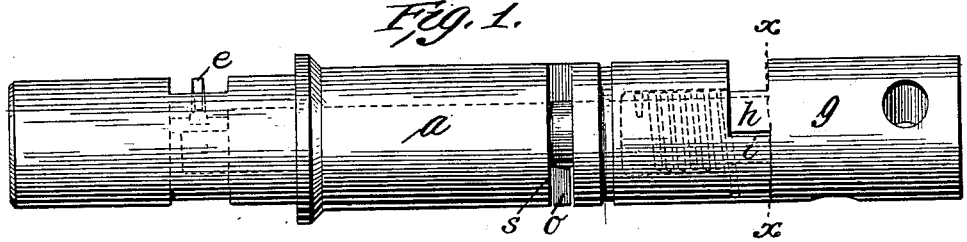
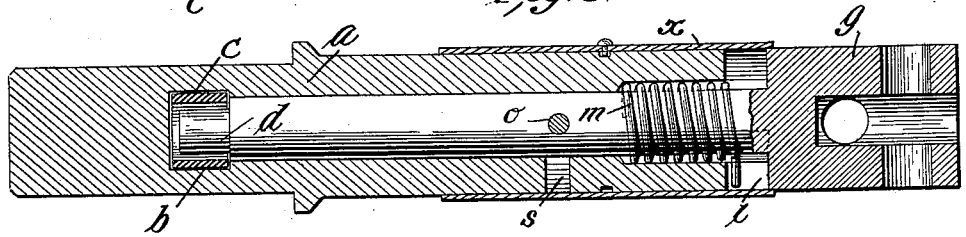
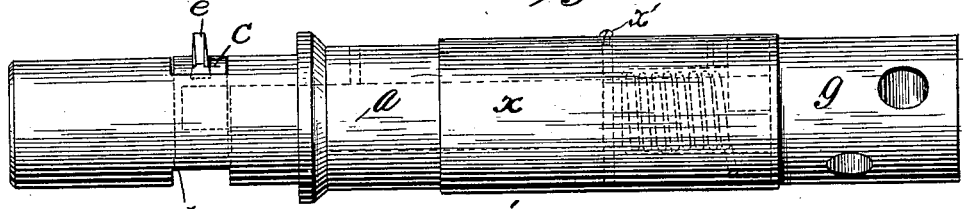
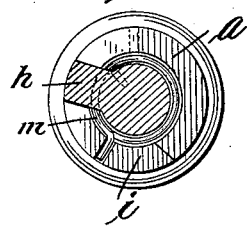
Attest  
L. A. Wiweke  
Claud M. Smith
Cornelius B. DeBolt  
Thomas W. Hinde  
Inventors
by Richards & Co  
Atty.
THE NORRIS PETERS CO., PHOTO-LITHO., WASHINGTON, D. C.

UNITED STATES PATENT OFFICE.

CORNELIUS B. DE BOLT AND THOMAS W. HINDE, OF CHEROKEE, IOWA.

FLUE-CUTTER.

SPECIFICATION forming part of Letters Patent No. 674,553, dated May 21, 1901.

Application filed January 12, 1901. Serial No. 43,066. (No model.)

*To all whom it may concern:*

Be it known that we, CORNELIUS B. DE BOLT and THOMAS W. HINDE, citizens of the United States, and residents of Cherokee, Iowa, have invented certain new and useful Improvements in Flue-Cutters, of which the following is a full, clear, and exact specification.

Our invention relates to flue-cutters in which a cutter reciprocates axially of a casing, the latter rotating after the cutter has reached the limit of its outward movement, both cutter and casing being operated by a rotary spindle.

The invention relates particularly to the means for connecting the spindle and casing.

To this end the invention includes means for operating the cutter to move the same into cutting position in advance of the rotation of the same in the casing and for returning the parts to their initial position after each operation.

The invention is shown in the accompanying drawings, in which—

Figure 1 is a side elevation with sleeve removed. Fig. 2 is a side elevation showing the spindle turned to raise the cutting-knife. Fig. 3 is a horizontal longitudinal sectional view. Fig. 4 is a vertical sectional view taken on the line $x\ x$ of Fig. 1, showing in dotted lines the spindle turned to raise the knife; and Fig. 5 is a view of the cutting-block.

The cylindrical casing or shell $a$ has an axial bore which terminates within the end thereof, from which a radial slot $b$, extending through the casing, leads to provide a guide for a cutter-block $c$, having an opening to receive an eccentric projection, extending from the end of the spindle. The cutter $e$ is fitted to a dovetailed slot in said block to permit of its ready removal when worn and the insertion of a new blade. The rear end of the spindle is provided with an integral head $g$, having radial holes for the reception of a lever for turning the spindle, and from the head a projection $h$ extends, which forms a locking radial projection on the spindle, which is adapted to interlock with a like projection $i$, extending from the end of said casing. A spiral spring $m$, surrounding the spindle and inclosed within the casing, has one of its ends secured in a hole in the former and its opposite end retained in a slot in the latter. This spring normally holds the casing and spindle in such relative relations that the knife is withdrawn within the periphery of the casing. With the parts in this position the tool is inserted within the flue to be cut. The initial rotation of the spindle takes place independently of the casing, expanding spring $m$ until the parts reach the position shown in Fig. 2, when the projections coming in contact the spindle and casing rotate in unison. During the independent rotation of the spindle the cutter is forced out, piercing the flue. The continued rotation of the spindle carries the cutter around, which cuts out a section. The spindle is freed after a complete rotation of the cutter, and the spring $m$ automatically returns the parts to normal position to permit the tool to be again positioned within the flue.

A sleeve $x$ is secured to the casing to cover the working parts and provide a surface to be gripped by the hand of the operator. The sleeve is held in position by means of a screw $x'$, projecting into a circumferential groove in the casing, which permits of the rotation of the latter independently of the sleeve.

To hold the spindle in place within the casing, which will lock the cutter-block in place within a slot $b$, holding the same between the end wall of the bore of the casing and the end of the spindle, a pin $o$ is provided, which extends through the spindle and projects into circumferential slot $s$.

We claim—

1. In combination in a flue-cutter, a casing having a transverse slot extending through the same near the end thereof and an axial bore extending from the opposite end of the casing and terminating in said transverse slot, an integral projection on the end of the casing, a knife and knife-carrier guided in said slot, a spindle fitted to said bore, an eccentric-pin carried thereby engaging the knife-carrier, an integral head on said spindle, and an integral projection extending from the end of the head coacting with the projection on the casing, substantially as described.

2. In combination, a casing having a transverse slot and central bore, a projection from the end of the casing, a spindle fitted to said bore, a knife and knife-carrier, an internal annular pocket in the end of the casing about said spindle, a spring located therein, an integral head on the spindle of the same diameter as said casing, a projection extending therefrom, and a sleeve turnably mounted on said casing, said sleeve bridging the space between the adjacent ends of the casing and head, substantially as described.

3. In combination, a casing having a transverse recess and annular bore, a knife and knife-carrier, a spindle fitted to the bore, a projection from the end of the casing, a spring interposed between the casing and spindle, one end of said spring being held in a recess in said projection, a head on said spindle, a projection on said casing, a circumferential slot in said casing, a pin extending from the spindle into said slot and a sleeve carried by the casing covering said slot and the space between the casing and spindle-head, substantially as described.

In witness whereof we have hereunto set our hands in presence of two witnesses.

CORNELIUS B. DE BOLT.
THOMAS W. HINDE.

Witnesses:
L. A. WIWEKE,
CLAUD M. SMITH.